(12) United States Patent
Lee

(10) Patent No.: US 10,808,774 B2
(45) Date of Patent: Oct. 20, 2020

(54) CLUTCH WITH SELECTABLE LOCKED AND ONE-WAY MODES

(71) Applicant: SCHAEFFLER TECHNOLOGIES AG & CO. KG, Herzogenaurach (DE)

(72) Inventor: Brian Lee, York, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 204 days.

(21) Appl. No.: 16/050,782

(22) Filed: Jul. 31, 2018

(65) Prior Publication Data

US 2020/0040950 A1 Feb. 6, 2020

(51) Int. Cl.
| | |
|---|---|
| *F16D 41/08* | (2006.01) |
| *F16D 41/063* | (2006.01) |
| *F16D 15/00* | (2006.01) |
| *F16D 27/10* | (2006.01) |
| *F16D 13/10* | (2006.01) |

(52) U.S. Cl.
CPC ........... *F16D 41/082* (2013.01); *F16D 13/10* (2013.01); *F16D 15/00* (2013.01); *F16D 27/10* (2013.01); *F16D 41/063* (2013.01)

(58) Field of Classification Search
CPC ........ F16D 13/10; F16D 15/00; F16D 41/063; F16D 41/082; F16D 27/10; F16D 27/102
See application file for complete search history.

(56) References Cited

U.S. PATENT DOCUMENTS

| | | | |
|---|---|---|---|
| 3,476,226 A * | 11/1969 | Massey | F16D 41/088 |
| | | | 192/27 |
| 5,067,598 A | 11/1991 | Ritter et al. | |
| RE38,012 E | 3/2003 | Ochab et al. | |
| 7,419,039 B2 * | 9/2008 | Yasui | F16D 27/10 |
| | | | 192/35 |
| 9,115,768 B2 | 8/2015 | Sturgin | |
| 2013/0126290 A1 * | 5/2013 | Parameswaran et al. | |
| | | | F16D 15/00 |
| | | | 192/45.001 |

FOREIGN PATENT DOCUMENTS

| | | |
|---|---|---|
| DE | 102013108030 A1 | 2/2015 |
| EP | 0391084 A1 | 10/1990 |
| GB | 2372524 B | 3/2004 |
| WO | 2017211340 A1 | 12/2017 |

\* cited by examiner

*Primary Examiner* — Richard M Lorence
(74) *Attorney, Agent, or Firm* — Brooks Kushman P.C.

(57) ABSTRACT

A clutch includes an inner race, an outer race defining an inner cam surface having lobes and valleys, and a plurality of wedge segments configured to selectively couple the inner and outer races. The wedge segments are circumferentially arranged around the inner race with each segment disposed between adjacent ones of the lobes and valleys. Each segment is circumferentially movable towards the adjacent lobe to increase friction with the inner race and towards the adjacent valley to decrease friction with the inner race. A cage is configured to drive the circumferential movement of the wedge segments. Rotation of the cage relative to the outer race in a first direction permits overrunning of the inner race in a second direction that is opposite the first direction while a second set of the segments locks the inner race from rotating in the first direction relative to the outer race.

17 Claims, 5 Drawing Sheets

CLUTCH WITH SELECTABLE LOCKED AND ONE-WAY MODES

TECHNICAL FIELD

The present disclosure relates to clutches configured to couple rotating shafts, and more specifically to clutches that include an operating mode in which the shafts are coupled in both directions and another operating mode in which the shafts are coupled in one direction and decoupled in the other direction.

BACKGROUND

A clutch is a component used to selectively couple two or more components such as rotatable shafts. The clutch may be engaged to couple the components and may be disengaged to decouple the components. Many types of clutches are known. One type of clutch developed is a wedge clutch. A wedge clutch may include an inner race connected to a shaft and an outer race connected to another shaft. A wedge plate is radially disposed between the inner and outer races and is configured to engage the inner and outer races when the clutch is engaged to transmit power from one shaft to another.

SUMMARY

According to one embodiment, a clutch includes an inner race, an outer race defining an inner cam surface having lobes and valleys, and a plurality of wedge segments configured to selectively couple the inner and outer races. The wedge segments are circumferentially arranged around the inner race with each segment disposed between adjacent ones of the lobes and valleys. Each segment is circumferentially movable towards the adjacent lobe to increase friction with the inner race and towards the adjacent valley to decrease friction with the inner race. The wedge segments are biased towards the lobes. A cage is configured to drive the circumferential movement of the wedge segments. Rotation of the cage relative to the outer race in a first direction moves a first set of the segments towards their adjacent valley to permit overrunning of the inner race in a second direction that is opposite the first direction while a second set of the segments locks the inner race from rotating in the first direction relative to the outer race.

According to another embodiment, a clutch includes an inner race, an outer race having an inner cam surface, and a plurality of clutch segments circumferentially arranged between the inner and outer races. The clutch segments have an outer ramped surface coordinating in shape with the inner cam surface so that radial positions of the clutch segments change in response to movement along the inner cam surface. The clutch segments are grouped in pairs of first and second segments that are arranged in a mirrored orientation relative to each other so that the first segment wedges between the inner and outer races in response to rotation of the inner race relative to the outer race in a first direction and so that the second segment wedges between the inner and outer races in response to relative rotation of the inner race relative to the outer race in a second direction. A cage is rotatable relative to the outer race in the first and second directions and is engagable with at least the first clutch segments. Rotation of the cage in the second direction relative to the outer race slides the first clutch segments on the inner cam surface to de-wedge the first segments permitting relative rotation between the races in the first direction.

According to yet another embodiment, a clutch includes an inner race, an outer race circumscribing the inner race and defining an inner cam surface and projections circumferentially spaced around the inner cam surface and extending radially inward therefrom. A wedge element of the clutch is radially disposed between the inner and outer races. The wedge element includes a plurality of arcuate segments circumferentially arranged around the inner race and cooperating to form a discontinuous outer cam surface that nests with the inner cam surface. Resilient members act between the projections and the segments to bias the segments away from their corresponding projection. The cam surfaces cooperate to urge the segments inwardly to increase friction between the segments and the inner race in response to movement of the segments away from their corresponding projection. A cage includes axially extending fingers disposed between the segments. The cage is rotatable relative to the outer race to engage the fingers with select ones of the segments to compress the resilient members and move the select segments towards their corresponding projections so that the cam surfaces cooperate to decrease friction between the select segments and the inner race permitting relative rotation between the inner and outer races.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
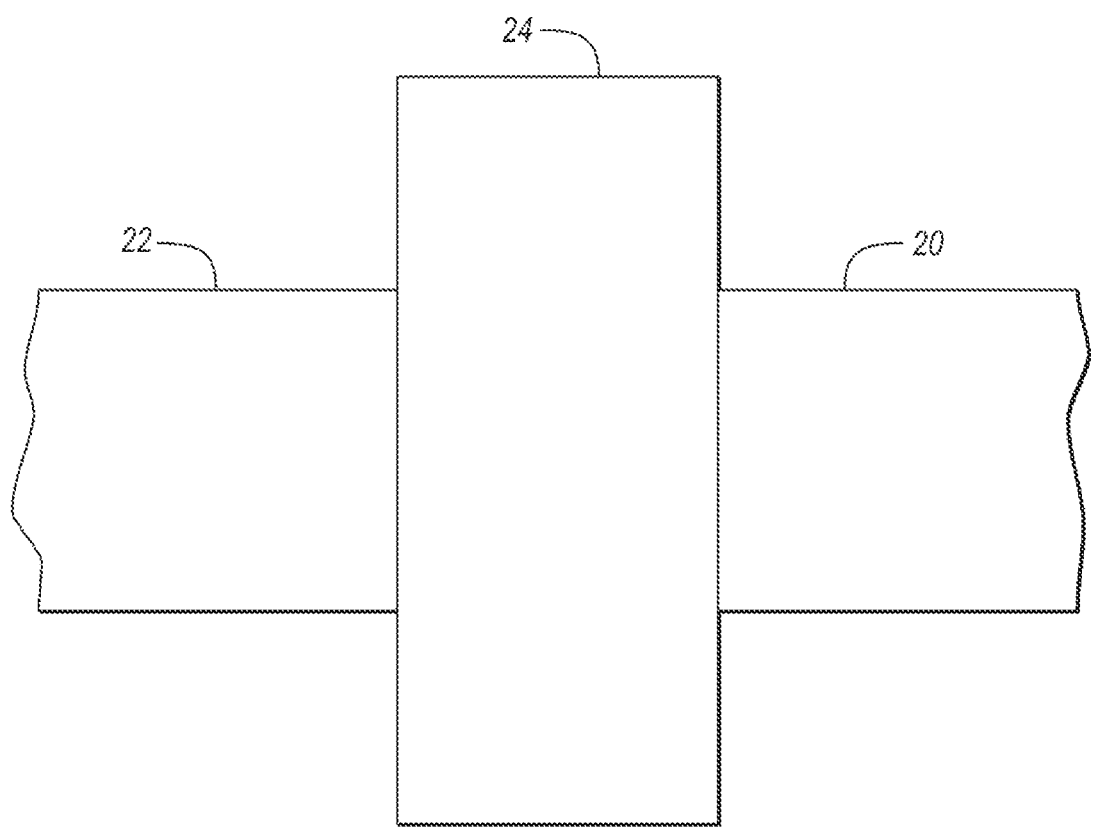
FIG. 1 side view of a clutch arranged between a pair of shafts.

Referring to FIG. 1, a pair of rotating members 20, 22 may be selectively coupled by a clutch 24. The rotating members 20, 22 and the clutch 24 may be for a vehicle. For example, the clutch 24 used in a hybrid vehicle to disconnect an internal-combustion engine from a hybrid transmission. In this example, the rotating member 20 may be a crankshaft of the engine and the rotating member 22 may be a cover of a torque converter (or a transmission input shaft if a torque converter is not used).

The clutch 24 may include a plurality of modes that engage and disengage the rotating members 20, 22 in a variety of directions. For example, the clutch 24 includes a fully locked mode (also known as lock-lock mode) in which the rotating members 20, 22 are coupled in both rotational directions and at least one one-way mode (also known as lock-free mode) in which the rotating members 20, 22 are coupled in a first rotational direction and are decoupled, i.e., overrun, in a second rotational direction that is opposite the first. The clutch 24 may include two one-way modes so that the overrunning direction can be switched to suit current operating conditions. The clutch 24 may be biased to the fully locked mode.

Figure 2:
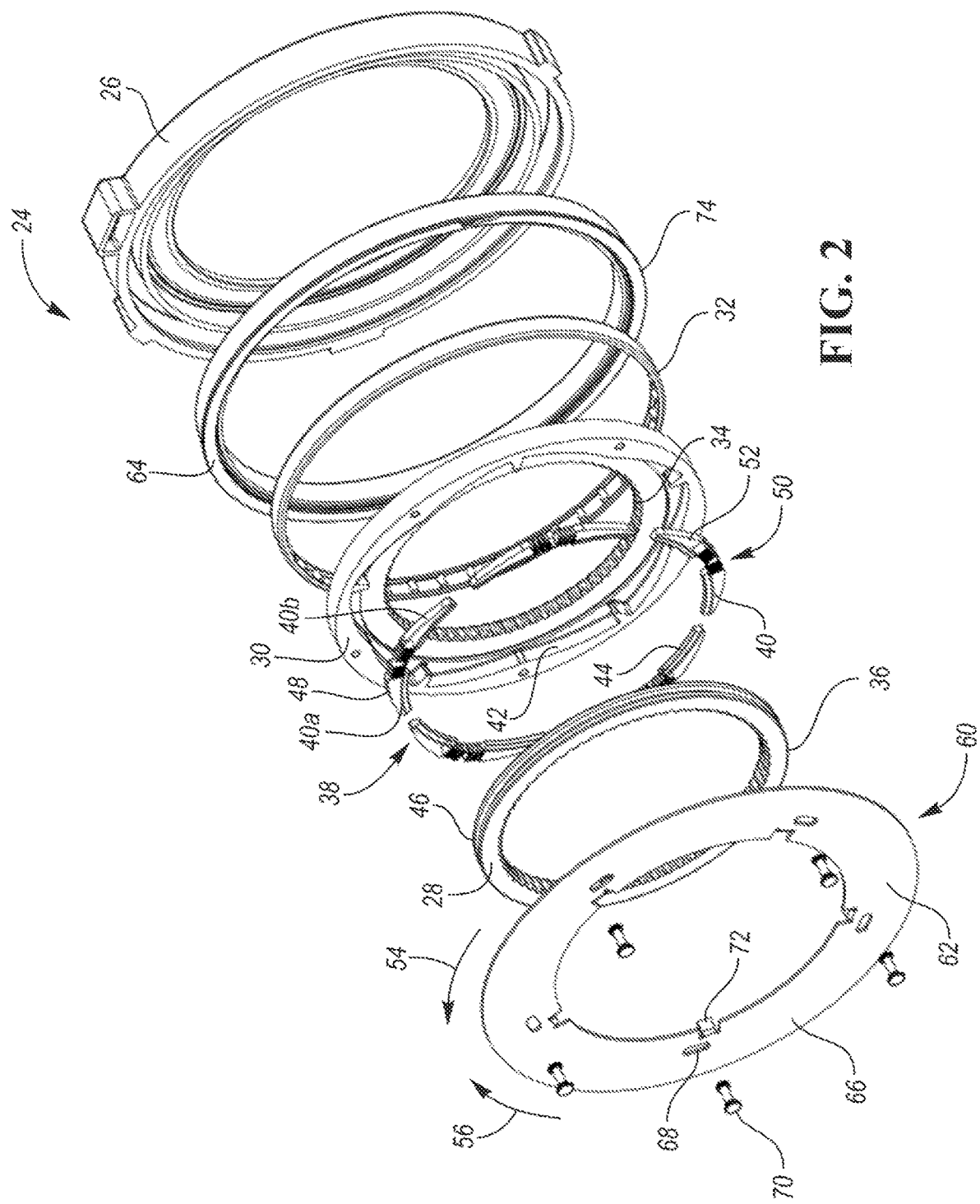
FIG. 2 is an exploded perspective view of the clutch according to one embodiment.

Referring to FIG. 2, the clutch 24 may include a housing 26 that is attachable to a support such as a vehicle chassis or other fixed structure. Inner and outer races 28, 30 are supported for concentric rotation within the housing 26. The housing 26 may define a seat that receives a roller bearing 32, which supports the outer race 30 for rotation within the housing 26. The outer race 30 is connectable to the rotating member 20, or alternatively to rotating member 22. The outer race 30 may define an internal spine 34 that receives an external spline of the rotating member 20 to rotationally lock the outer race 30 to the rotating member 20. Similarly, the inner race 28 may define an internal spine 36 to connect with an external spline of the rotating member 22, or alternatively rotating member 20.

A clutch element 38 is radially disposed between the inner and outer races 28, 30 and is configured to selectively lock the races 28, 30 in a variety of rotational directions depending upon the mode of the clutch 24. The clutch element 38 includes a plurality of wedges 40 circumferentially arranged around the inner race 28. Each wedge 40 has a circular inner diameter 44 that substantially matches the outer diameter 46 of the inner race 28 and an outer surface 48 that is ramped, to conform with the shape of an inner cam surface 42 formed on the outer race 30, causing the wedge 40 to taper in height along the arcuate direction of the wedge. Each of the wedges 40 may be the same, but are installed in the clutch 24 in either a first orientation or a second orientation that is mirrored relative to the first orientation. (The first and second orientations are mirrored over a radially extending line.) The wedges 40 are arranged in pairs 50 that form segments 52 of the clutch element 38. Each pair 50 includes a first wedge 40a that is in the first orientation and a second wedge 40b that is in the second orientation. The wedges 40a may be referred to as a first set of wedges and the wedges 40b may be referred to as a second set of wedges. The first and second sets of wedges alternate around the circumference of the clutch element 38.

The wedges 40 cooperate with the inner cam surface 42 to selectively couple the inner and outer races 28, 30 depending upon the positions of the wedges 40 on the inner cam surface 42. Each set of the wedges may be responsible for coupling the inner and outer races 28, 30 in one of the rotational directions. For example, the first set of wedges 40a can prevent the inner race 28 from rotating in a first direction 54 relative the outer race 30 and the second set of wedges 40b can prevent the inner race 28 from rotating in a second direction 56 relative the outer race 30 depending upon the location of the wedges 40 on the inner cam surface 42.

The wedges 40 may be controlled by an actuator 60. The actuator 60 may include an armature (also known as a cage) 62 that engages with the clutch element 38 and an electromagnet 64 that interacts with the armature 62. The armature 62 may include an annular plate 66 defining a plurality of arcuate slots 68 circumferentially arranged on the plate. The armature 62 may be rotatably attached to the outer race 30 by a plurality of fasteners 70, e.g., rivets, received through the slots 68. The slots 68 provide travel allowing the armature 62 a limited amount of rotation relative to the outer race 30 in both the first and second directions. The armature's amount of travel depends on the length of the slots 68. The electromagnet 64 may be fixed to the housing 26 and may include an electric coil 74. The coil 74 creates an electric field in response to current being supplied to the coil. The armature 62 is formed of a magnetic material, such as steel, and is placed to rotate within the electric field of the electromagnet 64. The electromagnet 64 creates an electric field that attracts the armature 62 with a force related to the strength of the field. With the armature 62 in contact with the magnet face, the frictional forces created by the magnetic attraction cause the armature 62 to slow relative to the outer race 30 and index to one end of the slots 68.

Indexing of the armature 62 moves the wedges 40 along the inner cam surface 42 to switch the clutch 24 between operating modes by altering the friction force between the wedges 40 and the inner race 28. The armature 62 may be configured to engage with only one of the first and second sets of the wedges at a time. The armature 62 may include a plurality of fingers 72 that are circumferentially arranged around the plate 66 so that each finger 72 is disposed between adjacent ones of the segments 52. Indexing of the armature 62 in the second direction 56 engages the fingers 72 with the wedges 40a to move the wedges 40a along the cam surface 42, and indexing of the armature 62 in the first direction 54 engages the fingers 72 with the wedges 40b to move the wedges 40b along the cam surface 42.

Figure 3:
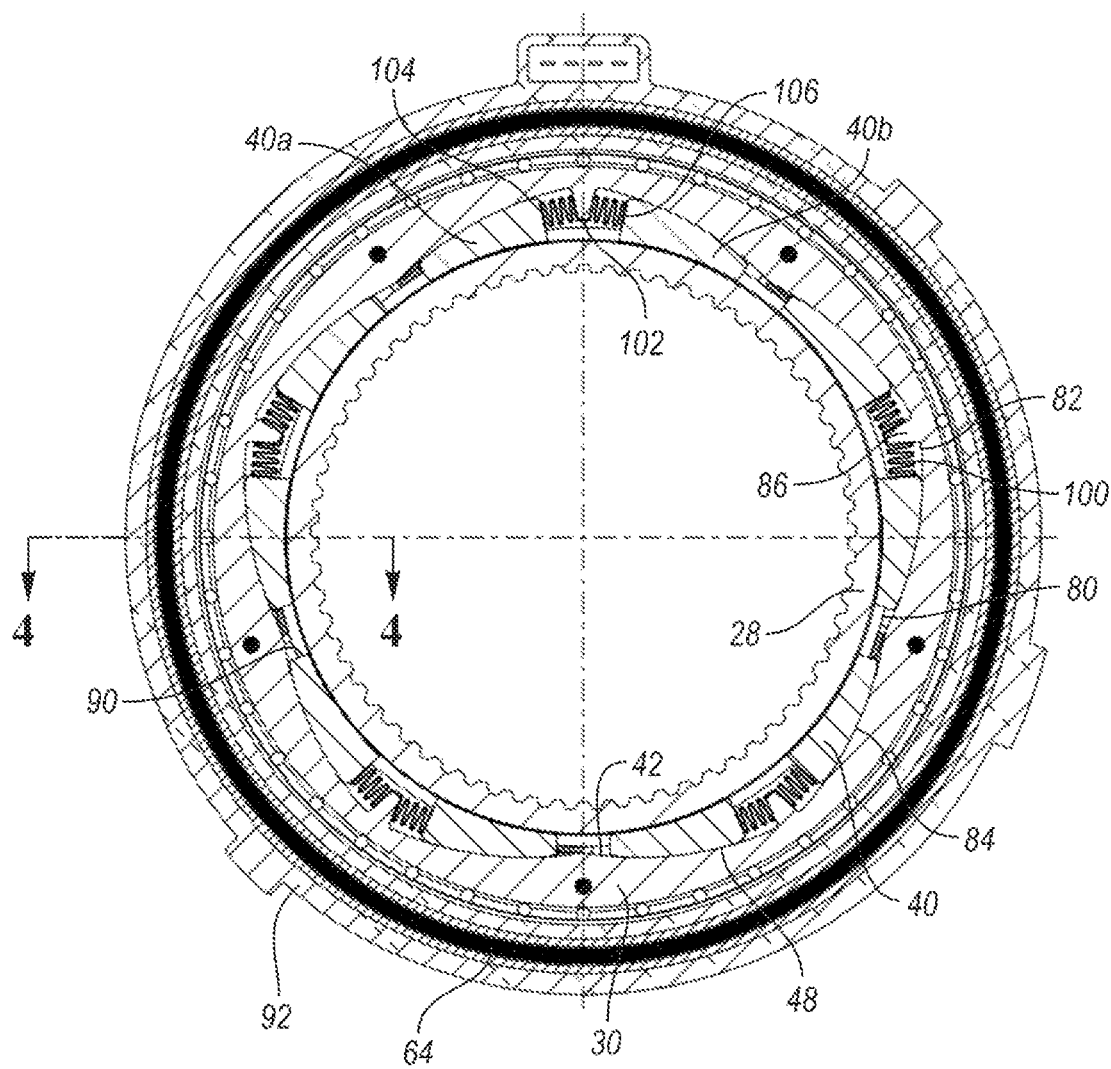
FIG. 3 is an axially cross-sectional view of the clutch of FIG. 2.
Figure 4:
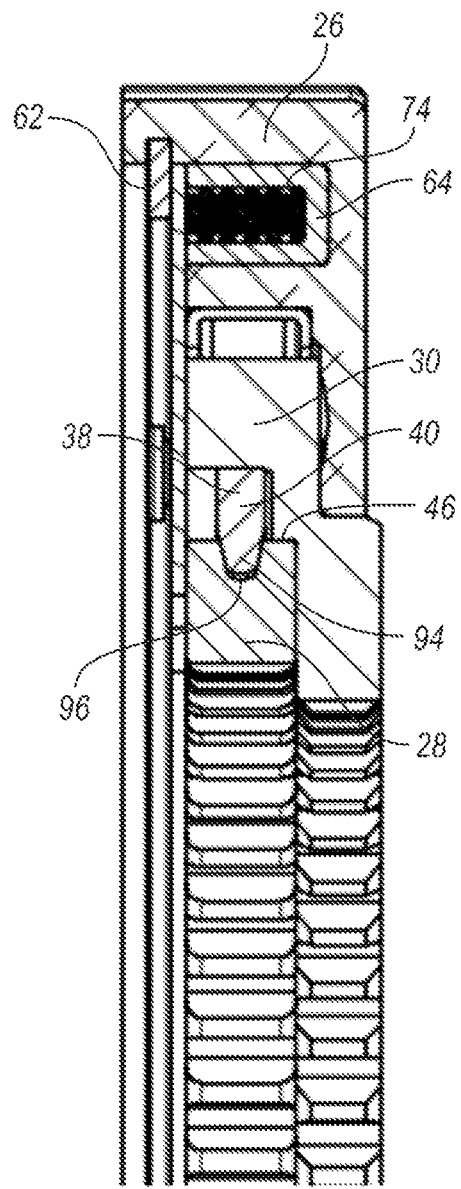
FIG. 4 is a cross-sectional view of the clutch along cutline 4-4.

Referring to FIGS. 3 and 4, the inner cam surface 42 includes lobes 80 and valleys 82 interleaved with the lobes 80. The lobes 80, are the inner-most portion of the cam surface 42 and the valleys are the outer-most portion of the cam surface 42. Ramps 84 each extend between adjacent ones of the lobes 80 and the valleys 82. Projections 86 extend radially inward from the valleys 82. Each set of ramps, lobes, projections, and valleys collectively define a generally wedge-shaped pocket in the outer race 30 for receiving one of the wedges 40.

Each of the wedges 40 is seated in one of the pockets with the outer surface 48 facing the ramp 84, a short end 90 facing the lobe 80, and a tall end 92 facing a valley 82. The outer surface 48 is ramped to match the ramps 84 so that the wedges 40 can slide along the inner cam surface 42. The wedges 40 may each include a projection 94 that is received within a circular groove 96 formed on the outer diameter 46 of the inner race 28. The groove 96 and the projections 94 may include matching slanted sides configured to frictionally engage each other to couple the clutch element 38 to the inner race 28. In some embodiments, the wedges 40 may include multiple projections that are received in multiple circular grooves of the inner race 28.

The wedges 40 may be biased towards the lobes 80 so that the clutch 24 is in the fully locked mode by default, i.e. the electromagnet 64 is OFF. The wedges 40 may be biased by resilient members 100 that act between the projections 86 and the tall ends 92. The resilient members 100 may be a spring, such as accordion springs (shown), coil springs, or the like.

In the illustrated embodiment, each resilient member 100 is disposed between adjacent wedges 40 near the valleys 82. Each of the resilient members 100 may include a midpoint 102 attached to the projection 86, e.g., a receptacle of the resilient member is received over a tip of the projection 86, a first end 104 in contact with one of the wedge segments 40a, and a second end 106 in contact with one of the wedge segments 40b. In other embodiments, the resilient members 100 may be replaced by resilient members that each act between one of the projections 86 and one of the wedges 40.

The clutch 24 may be referred to as a wedge clutch and operates by wedging the clutch element 38 into the inner race 28 to create a friction coupling. The cam surface 42 is shaped so that the wedges 40 cannot pass over the lobes 80 to lock the outer race 30 to the clutch element 38. This creates a power flow path through the clutch 24 so that power can be selectively transferred from one rotating member to another, e.g., rotating member 20 to rotating member 22.

The wedges 40 are biased towards the lobes 80 by the resilient members 100. This creates friction between the wedges 40 and the inner race 28, which causes the wedges 40 to decelerate relative to the outer race 30 when power is applied to the clutch 24. At least some of the decelerating wedges 40 ride down the ramps 84 increasing the friction between the wedges 40 and the inner race 28 to create a friction coupling sufficient to lock the inner and outer races 28, 30.

Figure 5:
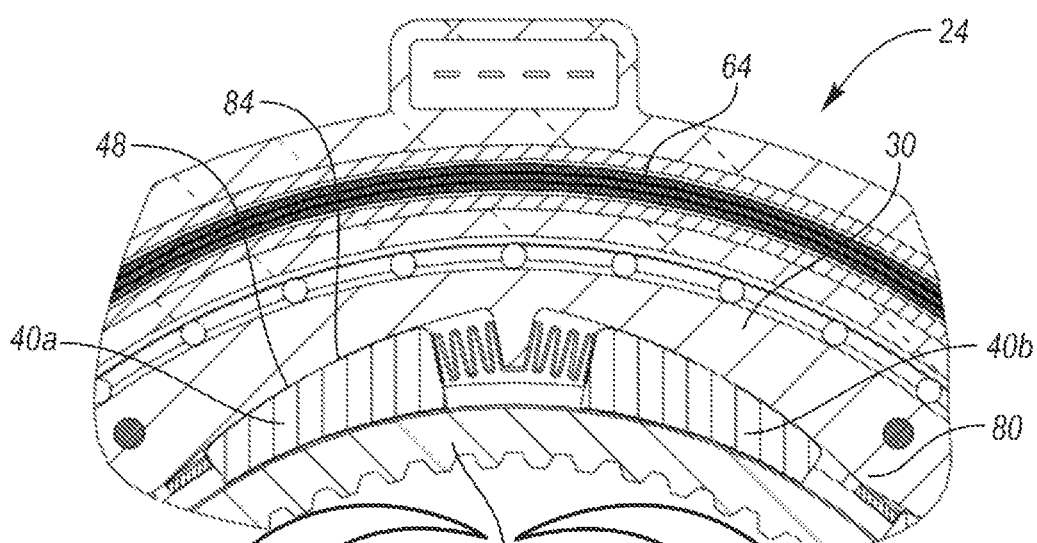
FIG. 5 is an axially cross-sectional view of the clutch in a fully locked mode.

FIG. 5 illustrates the clutch 24 in the fully locked mode in which the electromagnetic 64 is de-energized and the wedges 40a and 40b are biased towards the lobes 80. The wedges 40a are configured to prevent the inner race 28 from rotating in the first direction 54 relative to the outer race 30, and the wedges 40b are configured to prevent the inner race 28 from rotating in the second direction 56 relative to the outer race 30.

An example will now be described to explain operation of the clutch 24 in the fully locked mode. Assume that the outer race 30 is attached to the driving shaft and the inner race 28 is attached to the driven shaft. Further assume that the outer race 30 is rotating in the first direction 54. The wedges 40a prevent the inner race 28 from rotating in the first direction 54 relative to the outer race 30 as the drag force between the wedges 40a and the inner race 28 causes the ramps 84 and the outer surface 48 to ride up each other to create sufficient friction between the wedges 40a and the inner race 28 to lock the inner race 28 to the outer race 30. Similarly, the wedges 40b prevent the inner race 28 from rotating in the second direction 56 relative to the outer race 30. Thus, the wedges 40a and 40b cooperate to lock the inner race 28 to the outer race 30 in both directions.

Figure 6:
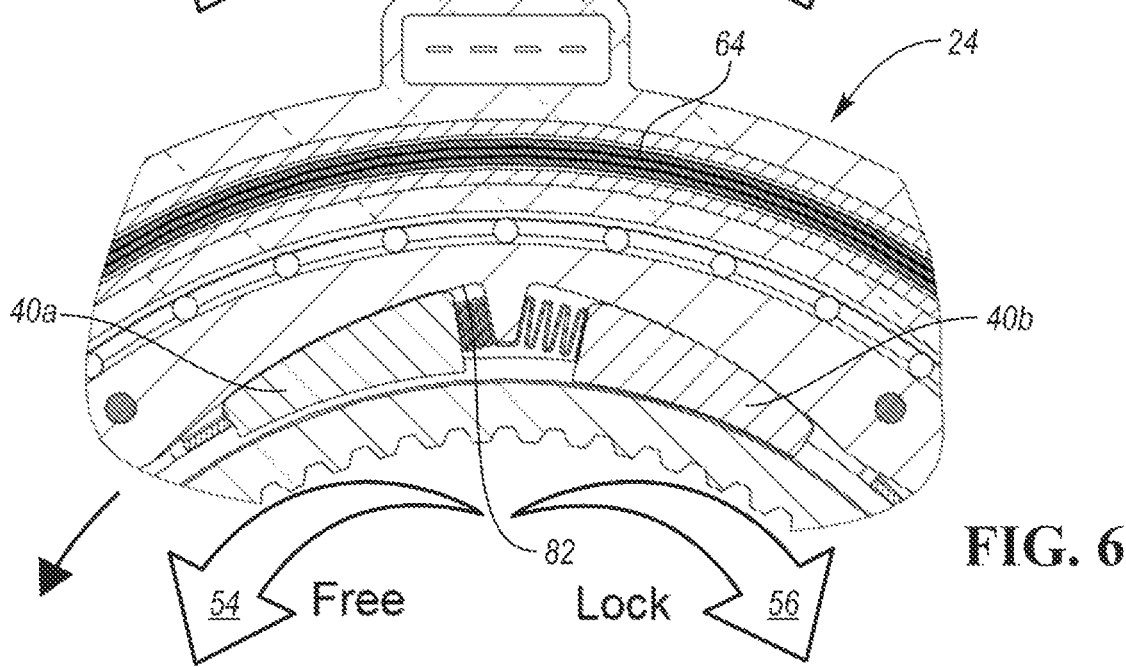
FIG. 6 is an axially cross-sectional view of the clutch in a one-way mode.

FIG. 6 illustrates the clutch 24 in a one-way mode. Continuing with the above example, the clutch 24 may be switched from the fully locked mode to the one-way mode by energizing the electromagnet 64. The electric field generated by the electromagnet 64 applies a braking force to rotate the armature 62 in the second direction 56 relative to the outer race 30, which is rotating in the first direction 54. The fingers 72 of the armature 62 engage with the short ends 94 of the wedges 40a to drive the wedges 40a towards the valleys 82, which decreases or eliminates the friction between the wedges 40a and the inner race 28 so that the inner race 28 can overrun in the first direction 54. The capability of the clutch 24 to be switched from the fully locked mode to a one-way mode while loaded is a significant advantage over existing designs. The clutch 24 can be switched while under load due to only one set of the wedges being loaded at any one time, thus allowing the unloaded set to be moved with the armature to a disengaged position near the valleys 82. While the outer race 30 is described as the driving member and the inner race 28 is described as the driven member in the above example, the inner race 28 may be the driving member in other embodiments.

While not illustrated, the clutch 24 may include a second one-way mode that can be entered into when the outer race 30 is rotating in the second direction 56. Here, the armature 62 rotates the wedges 40 in the first direction 54 relative to the outer race 30 so that the inner race 28 can overrun in the second direction 56.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

rotating members 20, 22
clutch 24
housing 26
inner race 28
outer race 30
bearing 32
internal spline 34
internal spline 36
clutch elements 38
wedges 40
inner cam surface 42
inner diameter 44
outer diameter 46
outer surface 48
pairs 50
segment 52
actuator 60 armature 62
electromagnet 64
annular plate 66
arcuate slots 68
fasteners 70
fingers 72
lobes 80
valleys 82
ramp 84
projections 86
tall end 90
short end 92
projection 94
groove 96
resilient members 100
midpoint 102

What is claimed is:

1. A clutch comprising:
an inner race;
an outer race defining an inner cam surface having lobes and valleys;
a plurality of wedge segments configured to selectively couple the inner and outer races and circumferentially arranged around the inner race with each segment disposed between adjacent ones of the lobes and valleys, each segment being circumferentially movable towards the adjacent lobe to create circumferential movement and increase friction with the inner race and towards the adjacent valley to decrease friction with the inner race, wherein the wedge segments are biased towards the lobes; and
a cage configured to drive the circumferential movement of the wedge segments, wherein the cage includes an annular plate defining arcuate slots circumferentially spaced around the plate and fasteners extending through the slots to attach the cage to the outer race such that the cage is rotatable relative to the outer race via the slots, wherein rotation of the cage relative to the outer race in a first direction moves a first set of the segments towards their adjacent valley to permit overrunning of the inner race in a second direction that is opposite the first direction while a second set of the segments locks the inner race from rotating in the first direction relative to the outer race.

2. The clutch of claim 1, wherein rotation of the cage relative to the outer race in the second direction moves the second set of segments towards their adjacent valley to permit overrunning of the inner race in the first direction while the first set of the segments locks the inner race from rotating in the second direction relative to the outer race.

3. The clutch of claim 1 further comprising resilient members acting between the outer race and the wedge segments to bias the wedge segments towards the lobes.

4. The clutch of claim 3, wherein the outer race defines projections that are each located at one of the valleys and extend radially inward therefrom, and each resilient member acts between one of the projections and at least one of the wedge segments.

5. The clutch of claim 1, wherein each wedge segment includes a ramped surface that matches the inner cam surface such that circumferential movement of the segment towards the adjacent lobe radially moves the segment towards the inner race and such that circumferential movement of the segment towards the adjacent valley radially moves the segment towards the outer race.

6. The clutch of claim 1 further comprising an electric coil energizeable to apply a braking force on the cage to rotate the cage relative to the outer race.

7. The clutch of claim 1, wherein the cage includes a plurality of axially extending fingers circumferentially arranged to be interposed with the wedge segments such that each finger is disposed between one of the segments of the first set and one of the segments of the second set.

8. The clutch of claim 7, wherein the fingers engage with the first set of the segments when rotated in the first direction and engage with the second set of the segments when rotated in the second direction.

9. A clutch comprising:
an inner race;
an outer race having an inner cam surface including lobes and valleys; and
a plurality of clutch segments circumferentially arranged between the inner and outer races and having an outer ramped surface coordinating in shape with the inner cam surface so that radial positions of the clutch segments change in response to movement along the inner cam surface, wherein each of the clutch segments is disposed between adjacent ones of the lobes and valleys, wherein the clutch segments are grouped in pairs of first and second segments that are arranged in a mirrored orientation relative to each other so that the first segment wedges between the inner and outer races in response to rotation of the inner race relative to the outer race in a first direction and so that the second segment wedges between the inner and outer races in response to relative rotation of the inner race relative to the outer race in a second direction;
a cage rotatable relative to the outer race in the first and second directions and engagable with at least the first clutch segments, wherein rotation of the cage in the second direction relative to the outer race slides the first clutch segments on the inner cam surface to de-wedge the first segments permitting relative rotation between the races in the first direction; and
an electric coil energizeable to apply a braking force on the cage to rotate the cage relative to the outer race; and
wherein
the outer race defines projections located at the valleys and extending radially inward therefrom to be disposed between the first and second segments of the pairs, and further comprising resilient members each attached to one of the projections at a midpoint of the resilient member and having first and second ends attached to associated one of the first and second segments, respectively, to bias the associated first and second segments away from the projection.

10. The clutch of claim 9, wherein the clutch segments are biased towards the lobes.

11. The clutch of claim 9, wherein the cage includes a plurality of axially extending fingers circumferentially arranged to be disposed between adjacent ones of the pairs.

12. The clutch of claim 11, wherein the cage includes an annular plate defining arcuate slots circumferentially spaced around the plate and fasteners extending through the slots to attach the cage to the outer race such that the cage is rotatable relative to the outer race via the slots.

13. The clutch of claim 9, wherein the cage is engageable with the second segments, and rotation of the cage in the first direction relative to the outer race slides the second segments on the inner cam surface to de-wedge the second segments permitting relative rotation between the races in the second direction.

14. A clutch comprising:

an inner race;

an outer race circumscribing the inner race and defining an inner cam surface and projections circumferentially spaced around the inner cam surface and extending radially inward therefrom;

a wedge element radially disposed between the inner and outer races, the wedge element including a plurality of arcuate segments circumferentially arranged around the inner race and cooperating to form a discontinuous outer cam surface that nests with the inner cam surface;

resilient members acting between the projections and the segments to bias the segments away from their corresponding projection, wherein the cam surfaces cooperate to urge the segments inwardly to increase friction between the segments and the inner race in response to movement of the segments away from their corresponding projection; and a cage including axially extending fingers disposed between the segments, the cage being rotatable relative to the outer race to engage the fingers with select ones of the segments to compress the resilient members and move the select segments towards their corresponding projections so that the cam surfaces cooperate to decrease friction between the select segments and the inner race permitting relative rotation between the inner and outer races.

15. The clutch of claim 14 further comprising an electric coil energizeable to apply a braking force on the cage to rotate the cage relative to the outer race.

16. The clutch of claim 14 further comprising a first shaft attachable to the inner race and a second shaft attachable to the outer race.

17. The clutch of claim 14, wherein the inner race defines a circular groove and each of the arcuate segments include an inner, arcuate projection that is received in the groove.

* * * * *